United States Patent [19]

Detrick et al.

[11] Patent Number: 5,418,013

[45] Date of Patent: May 23, 1995

[54] METHOD FOR DECREASING DRYING TIME

[75] Inventors: George F. Detrick, West Linn, Oreg.; Lawrence S. Frankel, Jenkintown, Pa.; Ernest R. Gommel, Philadelphia, Pa.; William A. Kirn, King of Prussia, Pa.

[73] Assignee: Rohm and Haas Company, Philadelphia, Pa.

[21] Appl. No.: 81,453

[22] Filed: Jun. 21, 1993

[51] Int. Cl.$^6$ ............................................. B05D 3/02
[52] U.S. Cl. ................................ 427/348; 427/385.5; 427/393.6
[58] Field of Search ............ 427/340, 341, 342, 385.5, 427/393.6

[56] References Cited

U.S. PATENT DOCUMENTS

| | | | |
|---|---|---|---|
| 4,071,645 | 1/1978 | Kahn | 427/340 |
| 4,088,810 | 5/1978 | Lodge | 427/397.8 |
| 4,536,417 | 8/1985 | Shimizu | 427/403 X |
| 4,609,573 | 9/1986 | Umata et al. | 427/403 |
| 4,954,544 | 9/1990 | Chandaria | 524/111 |

FOREIGN PATENT DOCUMENTS

| | | |
|---|---|---|
| 49046/72 | 5/1974 | Australia . |
| 488980A | 6/1992 | European Pat. Off. . |
| 60-170674 | 9/1985 | Japan . |
| 464415 | 12/1968 | Switzerland . |

*Primary Examiner*—Michael Lusignan
*Attorney, Agent, or Firm*—Ronald D. Bakule

[57] ABSTRACT

A method for decreasing the drying time of a wet coating by admixing said wet coating and at least one transient colorant in an amount effective to decrease the drying time, applying the admixture to a substrate, and drying the coating, is provided. The transient colorant may be, for example, a pH-sensitive colorant or a photobleaching colorant.

11 Claims, No Drawings

METHOD FOR DECREASING DRYING TIME

FIELD OF THE INVENTION

This invention relates to a method for decreasing the drying time of an aqueous coating. More particularly, this invention is directed to a method for decreasing the drying time of a wet coating by admixing a wet coating and at least one transient colorant in an amount effective to decrease the drying time, applying the admixture to a substrate, and drying the coating. The transient colorant is selected to provide a visible color to the wet coating, and thereby decrease the drying time of the wet coating when exposed to incident light, but to contribute, at most, a minimal level of color to the dried coating.

BACKGROUND OF THE INVENTION

Coating compositions may be applied to many structures. Either aqueous or nonaqueous coating compositions must dry before the protective and aesthetic properties of the compositions can be fully achieved. The drying time of the coating composition is particularly important for aqueous coatings dried outside as the drying rate is adversely affected by high humidity and, at the same time, rain, or even heavy dew, may cause a catastrophic failure such as washout of the coating film. The problems of achieving quick drying for aqueous compositions are aggravated when the composition is low in solids content or is applied as a thick coating. The drying time of a coating composition depends on its temperature; colored coatings drying outdoors with incident sunlight may achieve a higher temperature and higher drying rate than white coatings owing to the greater absorption of radiative energy by a colored coating.

Unfortunately, in many cases a colored coating is undesirable or unacceptable for functional and/or for aesthetic reasons. For example, white coatings are known to significantly reduce the surface temperature of roofs relative to dark colors. This reduction in surface temperature, which may be as much as 45 C., may drastically lower the energy requirements for air conditioning and may lessen the thermal shock associated with rain striking a hot roof. Such roof coatings are typically fairly thick—a dried coating thickness of 30 to 40 mils is common—and drying may be slow. Slow drying may hamper the application of subsequent coatings, particularly in the case of thick coatings on roofs where it is necessary for an operative to walk on the first coating during the application of the second coating.

DESCRIPTION OF THE PRIOR ART

Australian Patent AU 49046/72 discloses a surface coating composition incorporating a colouring substance which may be faded or leached out of the paint within a relatively short time. Expressly disclosed is a modified white or pastel coloured paint which is difficult to apply uniformly to a surface which has been precoated with a paint of the same colour.

The problem faced by the inventors was increasing the drying rate of an applied coating composition without permanently altering its appearance.

STATEMENTS OF THE INVENTION

According to a first aspect of the present invention there is provided a method for decreasing the drying time of a wet coating by admixing a wet coating and at least one transient colorant in an amount effective to decrease the drying time, applying the admixture to a substrate, and drying the coating.

According to a second aspect of the present invention there is provided a method for decreasing the drying time of a wet mastic by admixing a wet mastic and at least one transient colorant in an amount effective to decrease the drying time, applying the admixture to a substrate, and drying the coating.

DETAILED DESCRIPTION OF THE INVENTION

This invention is directed to a method for decreasing the drying time of a wet coating by admixing a wet coating and at least one transient colorant in an amount effective to decrease the drying time, applying the admixture to a substrate, and drying the coating.

The wet coating may be any pigmented or unpigmented architectural or industrial coating. The wet pigmented coating contains at least one pigment and at least one polymeric binder. The pigment may include inorganic materials such as, for example, titanium dioxide, calcium carbonate, clay, and the like, as well as organic pigments such as, for example, polystyrene beads and aqueous dispersions of water-insoluble polymers which yield air-filled voids on drying of the coating composition. The polymeric binder may include polymers such as, for example, acrylic (co)polymer, vinyl acetate polymer, vinyl/acrylic copolymer, styrene/acrylic copolymer, polyurethanes, styrene/butadiene polymer, and the like, and mixtures thereof. Preferred are coatings wherein the polymeric binder is an aqueous emulsion-polymerized addition polymer.

Preferred are coatings applied in wet thicknesses of greater than 10 mils; especially preferred are coatings, mastics, caulks, and sealants which are applied in wet thicknesses greater than about 20 mils, and which particularly benefit from faster drying.

The coating may contain, in addition, other components such as, for example, emulsifiers, dispersants, curing agents, coalescents, wetting agents, biocides, thickeners, rheology modifiers, plasticizers, anti-foaming agents, other colorants, waxes, or anti-oxidants, and the like.

A transient colorant as defined herein is a composition such as, for example, a dye which substantially changes in color during or after the drying of a coating containing the transient colorant. The transient colorant in the wet coating is present in an amount effective to increase the drying rate of the coating relative to the drying rate of the coating absent the transient colorant. The transient colorant in the dry coating may contribute other beneficial properties in the dry film but must contribute, at most, a minimal level of color to the dry film after a period of drying such as, for example, one week. Preferred is an transient colorant which is strongly visible light-absorptive, i.e., deeply colored, in the wet coating and which is colorless or white in the dry coating. The transient colorant is used at a level from about 0.001% to about 0.5%, by weight based on the weight of the wet coating. Preferred is a level from about 0.03% to about 0.3%, by weight based on the weight of the wet coating.

Suitable transient colorants useful in the invention must substantially diminish in effectiveness in contributing to the absorption of visible light, or to the production of color, during or after the drying of a paint film containing the transient colorant. The agent causing the diminution of the light absorption may be external to the paint film or within the film.

An external agent may be present in the ambient atmosphere or on the substrate surface, whether naturally occurring or externally introduced. External agents include, for example, oxygen, carbon dioxide, sulfur oxides, water (in the case of solvent-borne paints), salts, lignins, and the like.

Agents within the film may result from a change in the composition of the film occasioned by the drying process itself such as, for example, a pH change or a change in the relative concentration of a complexation agent.

The mechanism by which the transient colorant substantially diminishes in its effectiveness in contributing to light absorption, or color, during the drying of a paint film containing the transient colorant is not a limitation of this invention but may include mechanisms such as, for example, oxidation, dehydration, photobleaching, pH indicator effect, complexation, chemical reaction, and the like.

Examples of suitable transient colorants include, for example, phenolphthalein, thymolphthalein, cresol red, o-cresolphthalein, fluorescein, aniline blue, rhodamine B, Janus green B, Toluidine Blue O, methylene blue, Evans blue, Safranin O, rose bengal, ruthenium red, pararosaniline, and the like, and mixtures thereof.

In one preferred embodiment of this invention an aqueous coating is admixed with at least one pH indicator which substantially decreases in color upon a change in paint pH occasioned by the drying of the coating. The intrinsic pH of a coating herein is taken to be the pH of the wet coating absent a volatile acid or base. If a wet coating, either during the preparation of the coating or thereafter, has been adjusted to a pH higher than its intrinsic pH at least in part with a volatile base such as, for example, ammonia, the pH of the wet coating will drop, i.e., the coating will become relatively more acidic, during the drying of the paint film and a pH-sensitive colorant, or indicator, which is colored at a pH higher than the intrinsic pH of the wet coating and which is substantially less colored or colorless at the intrinsic pH of the wet coating may be used. Alternatively, if a wet coating, either during the preparation of the coating or thereafter, has been adjusted to a pH lower than its intrinsic pH at least in part with a volatile acid such as, for example, acetic acid, the pH of the wet coating will increase, i.e., the coating will become relatively more basic, during the drying of the paint film and a pH-sensitive colorant, or indicator, which is colored at a pH lower than the intrinsic pH of the wet coating and which is substantially less colored or colorless at the intrinsic pH of the wet coating may be used. Suitable pH-sensitive colorants which are used with volatile bases include, for example, phenolphthalein, thymolphthalein, cresol red, o-cresolphthalein, fluorescein, aniline blue, and the like, and mixtures therof.

In another preferred embodiment of this invention an aqueous coating is admixed with at least one transient colorant which substantially decreases in color upon drying of the coating in air, the color change believed to be due to photobleaching of the colorant. Suitable colorants include phenolphthalein, thymolphthalein, cresol red, o-cresolphthalein, fluorescein, aniline blue, rhodamine B, Janus green B, Toluidine Blue O, methylene blue, Evans blue, Safranin O, rose bengal, ruthenium red, pararosaniline, and the like, and mixtures thereof.

The method of this invention for improving the drying time of a coating involves admixing a wet coating and at least one transient colorant, and applying the admixture to a substrate. The transient colorant may be dissolved or dispersed in the continuous phase of the paint. For example, when an aqueous or waterborne paint is used, the transient colorant may first be dissolved or dispersed in water or at least one water-miscible solvent, or mixtures thereof. A water-soluble dye is preferred. Admixing is easily accomplished with stirring or mechanical mixing.

The substrate to which the admixture of this invention may be applied includes wood, plastic, metal, cementitious and asphaltic substrates, previously primed or coated substrates, and the like. Preferred substrates are architectural substrates such as walls, roofs, roofing membranes, windows, window frames, joints at the intersection of such substrates, and the like. The admixtures of this invention may be applied to a substrate by methods well known in the art of applying coatings, mastics, caulks, and sealants such as air-assisted spray, airless spray, brush, roller, mop, squeege, caulk gun, and the like.

The following examples are intended to illustrate the method for increasing the drying rate of a coating of this invention. They are not intended to limit the invention as other applications of the invention will be obvious to those of ordinary skill in the art.

EXAMPLES 1-4 AND COMPARATIVE EXAMPLES A-B.

Decreasing drying time of mastic coating with transient colorants.

Preparation of Comparative A. The following ingredients were dispersed for 15 minutes at high speed in a Cowles mixer. Quantities given are in grams.

| | |
|---|---|
| Water | 152.5 |
| Ethylene glycol | 24.4 |
| Hydroxyethyl cellulose (NATROSOL 250 MHR) | 4.2 |
| Polyacid pigment dispersant (30% solids) (TAMOL 850) | 4.8 |
| Defoamer (NOPCO NXZ) | 1.9 |
| Titanium dioxide (TI-PURE R-960) | 70.4 |
| Zinc Oxide (KADOX 915) | 46.9 |
| Alumina (ALCOA C-330) | 377.0 |
| Biocide (SKANE M-8) | 2.1 |

To the above grind were added the following, in the order given, with stirring:

| | |
|---|---|
| Acrylic polymeric binder (55% solids) (RHOPLEX EC-1791) | 470.6 |
| Coalescent (TEXANOL) | 7.0 |
| Defoamer (NOPCO NXZ) | 1.9 |

NATROSOL is a trademark of Hercules Co.; TAMOL, SKANE, and RHOPLEX are trademarks of Rohm and Haas Co.; TI-PURE is a trademark of E. I. DuPont de Nemours Co.; KADOX is a trademark of Zinc Corporation of America; ALCOA is a trademark of Aluminum Company of America; TEXANOL is a trademark of Eastman Kodak Co.; NOPCO is a trademark of Henkel Corp..

For Examples 1–3, 4.0 grams of colorant was dissolved in 20 grams of 3A (denatured) ethanol and the solution was diluted with 20 grams of water. To 1165 grams of Comparative A was added 10.0 grams of the colorant solution.

For Example 4, 4.0 grams of phenolphthalein was added to 100 grams of 3A ethanol. To 1165 grams of Comparative A was added 11.0 grams of the colorant solution.

For Comparative B. To 1165 grams of Comparative A was added 2.0 grams of lamp black dispersion (Colortrend 888–9907 colorant).

Test films were cast using a 50 mil drawdown block, which yielded a dry coating of approximately 20 mils.

The coated panels were placed outside on a horizontal plywood sheet at Springhouse, Pa. on a sunny day with no clouds with the temperature at 82 F. and the Relative Humidity at 40%. Films were checked every 5 minutes in determining the progression of drying. Skin formation time was the visual obsevation of a skin by light finger pressure. Tack-free time was based on touching the film with light finger pressure. Surface dry time was based on a thumb twist with moderate pressure to determine that there was a tough skin with an underlying soft layer. Total dry time was determined as the time to no coating movement under moderate pressure thumb twist. Results are reported in Table 1.1

TABLE 1.1

Drying time with transient colorant

| EXAMPLE | Comp. A | Comp. B | 1 |
|---|---|---|---|
| Added Colorant | None | Lamp Black | Aniline Blue |
| Initial Color | white | gray | blue |
| Skin Formation Time | 50 | 20 | 25 |
| Tack Free Time | 60 | 25 | 30 |
| Surface Dry Time | 80 | 45 | 35 |
| Total Dry Time | 110 | 55 | 70 |
| % Improvement | — | 200 | 157 |
| Final Color | white | gray | white |

| EXAMPLE | 2 | 3 | 4 |
|---|---|---|---|
| Added Colorant | Janus Green B | Toluidine Blue | Phenolphthalein |
| Initial Color | purple-gray | purple | dark pink |
| Skin Formation Time | 15 | 15 | 25 |
| Tack Free Time | 20 | 20 | 30 |
| Surface Dry Time | 25 | 25 | 45 |
| Total Dry Time | 50 | 50 | 60 |
| % Improvement | 220 | 220 | 183 |
| Final Color | white | white | white |

Examples 1–4 of this invention demonstrate decreased drying time relative to Comparative A which contains no transient colorant. Decreased drying time is demonstrated for Comparative B containing a permanent colorant relative to Comparative A, but the appearance of the dried coating is permanently altered.

EXAMPLES 5–9 AND COMPARATIVE EXAMPLES C–D.

Decreasing drying time of mastic coatings with transient colorants.

Comparative C was prepared in the same manner as Comparative A herein-above.

For Example 5, 12.0 grams of Phenol Red was added with mixing to 1165 grams of Comparative A.

For Example 6, 1.5 grams of O-Cresolphthalein was dissolved in 100 grams of 3A (denatured) ethanol. To 1165 grams of Comparative A was added 6.5 grams of the colorant solution.

For Example 7, 4.0 grams of Thymolphthalein was dissolved in 100 grams of 3A (denatured) ethanol. To 1165 grams of Comparative A was added 16.0 grams of the colorant solution.

For Example 8, 4.0 grams of phenolphthalein was added to 100 grams of 3A ethanol. To 1165 grams of Comparative A was added 11.0 grams of the colorant solution.

For Example 9, 1.0 grams of Toluidene Blue was dissolved in 50 grams of water. To 1165 grams of Comparative A was added 20.0 grams of the colorant solution.

For Comparative D. To 1165 grams of Comparative A was added 2.0 grams of lamp black dispersion (Colortrend 888–9907 colorant).

Test methods used were those presented above in Examples 1–4.

The coated panels were placed outside on a horizontal plywood sheet at Springhouse, Pa. on a sunny to partly cloudy day with the temperature at 70 F. and the Relative Humidity at 30%. Results are reported in Table 5.1

TABLE 5.1

Drying time with transient colorants

| Example | Comp. C | Comp. D | 5 |
|---|---|---|---|
| Added Colorant | None | Lamp Black | Phenol Red |
| Initial Color | white | gray | pink |
| Skin Formation Time | 48 | 15 | 20 |
| Tack Free Time | 60 | 20 | 35 |
| Surface Dry Time | 70 | 35 | 55 |
| Total Dry Time | 105 | 45 | 80 |
| % Improvement | — | 233 | 131 |
| Final Color | white | gray | white |

| Example | 6 | 7 |
|---|---|---|
| Added Colorant | O-Cresolphthalein | Thymolphthalein |
| Initial Color | purple | Lt. Blue |
| Skin Formation Time | 10 | 10 |
| Tack Free Time | 20 | 20 |
| Surface Dry Time | 35 | 45 |
| Total Dry Time | 55 | 90 |
| % Improvement | 190 | 117 |
| Final Color | white | white |

| Example | 8 | 7 |
|---|---|---|
| Added Colorant | Phenolphthalein | Toluidene Blue |
| Initial Color | Dark pink | Dark purple |
| Skin Formation Time | 15 | 15 |
| Tack Free Time | 20 | 20 |
| Surface Dry Time | 35 | 30 |
| Total Dry Time | 50 | 40 |
| % Improvement | 210 | 260 |
| Final Color | white | white |

Examples 5–9 of this invention demonstrate decreased drying time relative to Comparative C which contains no transient colorant. Decreased drying time is demonstrated for Comparative D containing a permanent colorant relative to Comparative C, but the appearance of the dried coating is permanently altered.

EXAMPLES 10–11

Decreasing drying time of mastic coatings with transient colorants.

Comparative E was prepared in the same manner as Comparative A herein-above.

For Example 10, 800 p.p.m. toluidine blue, based on binder weight was added with mixing to Comparative E.

For Example 11,800 p.p.m. methylene blue, based on binder weight was added with mixing to Comparative E.

Test methods used for measuring dry times were those presented above in Examples 1-4. Reflectance was measured using a Colorgard 45/0 Reflectometer; with a Leneta chart color control, reflectance over white=80 and black=1.

The coated panels were placed outside on a horizontal plywood sheet at Springhouse, Pa. on a sunny, clear day with a very slight breeze, with the initial temperature at 75 F. and the Relative Humidity at 43%. Results are reported in Table 10.1

TABLE 10.1

| | Drying time with transient colorants | | |
|---|---|---|---|
| Example | Comp. E | 10 | 11 |
| Added Colorant | None | toluidene blue | methylene blue |
| Initial Color | white | purple/blue | dark blue |
| Tack Free Time (min.) | 40 | 17 | 18 |
| Surface Dry Time (min.) | 60 | 30 | 25 |
| Total Dry Time (min.) | 170 | 80 | 60 |
| Reflectance | | | |
| 1 hr. | 94 | 77 | 64 |
| 2 hr. | 94 | 70 | 81 |
| 3 day | 92 | 88 | 83 |
| 5 day | 91 | 87 | 85 |
| 7 day | 90 | 86 | 90 |

Examples 10 and 11 of this invention exhibit decreased drying time relative to Comparative E. The color of Examples 10 and 11 faded to white over a 7 day period based on the reflectance data.

EXAMPLES 12-13

Decreased drying time for clear caulk

Preparation of Comparative F. The following ingredients were mixed for 45 minutes and then de-aerated.

| | |
|---|---|
| Acrylic latex (62% total solids) (Rhoplex 2620) | 726.0 |
| Premix of: | |
| Water | 8.0 |
| Sodium lauryl sulfate (28%) | 4.0 |
| Biocide (KATHON LX (1.5%)) | 0.6 |
| Ethylene glycol | 7.5 |
| Propylene glycol | 7.5 |
| Premix of: | |
| Mineral oil | 50.0 |
| Silane Z-6040 | |
| Premix of: | |
| Water | 40.0 |
| Ammonium hydroxide (28%) | 8.0 |
| Biocide (SKANE M-8) | 0.5 |
| Silica (CAB-O-SIL M-5) | 25.0 |
| UV Stabilizer (TINUVIN 1130) | 0.4 |

CAB-O-SIL is a trademark of the Cabot Corp.; TINUVIN is a trademark of Ciba-Geigy Corp.

Preparation of Example 12. To 50 g. of Comparative F (clear caulk) was added 1.0 g. of a solution of 1.0 g. toluidine blue dissolved in 50 g. water.

Preparation of Example 13. To 50 g. of Comparative E (clear caulk) was added 0.1 g. of a solution of 1.0 g. toluidine blue dissolved in 50 g. water.

Caulks—Examples 12-13 and Comparative F—were cast in 3.5 inch diameter plastic Petri dishes to a thickness of 0.25 inches with a thermometer embedded in the caulk. Caulk samples were placed outside on a sunny day at 58 F. and Relative Humidity of 30%.

TABLE 12.1

Increased caulk temperature on exposure to sunlight for clear caulks incorporating transient colorant.

| | | Caulk Temperature (F.) | |
|---|---|---|---|
| Time | Ambient Temp. (F.) | Comparative F | Example 12 |
| 0 | 58 | 58 | 58 |
| 1 hr. | 62 | 58 | 74 |
| 2 hr. | 68 | 60 | 78 |

After two weeks exposure, Example 13 was almost clear, almost colorless, and visibly less milky (i.e., drier) than Comparative F (which has a milky emulsion appearance when wet).

After four weeks exposure, Example 13 was clear and colorless while Comparative F still appears milky white. Example 12 was still not colorless.

Example 12 of this invention attains a higher temperature during drying, and, therefore, is believed to dry faster, than Comparative F. Example 13 of this invention dries faster than Comparative F and its transient color disappears on exposure.

EXAMPLES 14-15

Decreasing drying time for Exterior Insulated Finish System (EIFS) Finish coat

Preparation of Comparative G. EIFS Finish coat was prepared by mixing the following for minutes using a ribbon mixer (quantities are in grams).

| | |
|---|---|
| Acrylic latex (46.5% solids) | 405.0 |
| Ethylene glycol | 5.0 |
| Defoamer (Nopco NXZ) | 2.0 |
| Titanium dioxide (TI-PURE R-942 Slurry) | 65.0 |
| Quartz (MYSTIC WHITE #15)-150.0 (MYSTIC WHITE #90)-850.0 | 1000.0 |
| Attapulgite clay (ATTAGEL 50) | 10.0 |
| Biocides (DOWCIL-75)-4.0 (SKANE M-8)-2.0 | 6.0 |
| Coalescent (TEXANOL) | 6.0 |
| Anionic thickener (RHOPLEX ASE-60) | 6.0 |
| Water | 18.03 |
| Aqueous ammonia (28%) | 2.0 |

MYSTIC WHITE is a trademark of U.S. Silica Co.; ATTAFEL is a trademark of Engelhard Corp.

Preparation of Example 14. To 1165 grams of Comparative G was added, with stirring, 20.0 grams of a solution of 1.0 g. toluidine blue dissolved in 50 g. water.

Preparation of Example 15. To 1165 grams of Comparative G was added, with stirring, 11.0 grams of a solution of 4.0 g. phenolphthalein dissolved in 100 g. denatured(3A) ethanol.

Examples 14, 15, and Comparative G were cast on glass plates at a wet thickness of 0.125 inches and were placed outside on a sunny, windy(ca. 10 m.p.h.) day with ambient temperature of 62 F. and 35% relative humidity. Drying rate data according to the test procedures of Example 1 are presented in Table 14.1

TABLE 14.1

| | Drying of EIFS Finish coat | | |
|---|---|---|---|
| Sample | Comparative G | Example 14 | Example 15 |
| Color | white | blue | pink |

TABLE 14.1-continued

| | Drying of EIFS Finish coat | | |
|---|---|---|---|
| Sample | Comparative G | Example 14 | Example 15 |
| Skin Form. time | 20 | 15 | 20 |
| Tack Free time | 30 | 30 | 30 |
| Surface Dry time | 120 | 60 | 120 |
| Total Dry time | 280 | 120 | 270 |

Example 14 of this invention exhibits a significantly decreased dry time relative to Comparative G. Example 15 is barely sufficient in amount of transient colorant to exhibit a decreased dry time in this use under these drying conditions.

EXAMPLES 16–17

Decreasing dry time for elastomeric wall coating

Preparation of elastomeric wall coating—Comparative H. The following ingredients (all quantities are in grams) were added in the order given and dispersed using a Cowles mixer at high speed for 15 minutes.

| Water | 171.7 |
|---|---|
| Anionic pigment dispersant (30% solids) (TAMOL 850) | 5.0 |
| Potassium tripolyphosphate | 1.5 |
| Defoamer (NOPCO NXZ) | 2.0 |
| Calcium carbonate (CAMEL WITE) | 445.0 |
| Titanium dioxide (TI-PURE R-960) | 74.2 |
| Zinc oxide (KADOX 515) | 49.5 |
| The following ingredients were added to the grind with stirring. | |
| Acrylic latex binder polymer (RHOPLEX 2447) | 439.9 |
| Defoamer (NOPCO NXZ) | 2.0 |
| Coalescent (TEXANOL) | 7.3 |
| Biocide (SKANE M-8) | 2.2 |
| Ammonia (28%) | 1.0 |
| Premix of: | |
| Ethylene glycol | 25.7 |
| Thickener (NATROSOL 250MXR) | 4.4 |

Preparation of Example 16. To 1165 grams of Comparative H was added, with stirring, 20.0 grams of a solution of 1.0 g. toluidine blue dissolved in 50 g. water.

Preparation of Example 17. To 1165 grams of Comparative H was added, with stirring, 11.0 grams of a solution of 4.0 g. phenolphthalein dissolved in 100 g. denatured (3A) ethanol.

Examples 16, 17, and Comparative H were cast on glass plates at a wet thickness of 50 mils and were placed outside on a sunny, windy(ca. 10 m.p.h.) day with ambient temperature of 62 F. and 35% relative humidity. Drying rate data according to the test procedures of Example 1 are presented in Table 16.1.

TABLE 16.1

| | Drying of elastomeric wall coating | | |
|---|---|---|---|
| Sample | Comparative H | Example 16 | Example 17 |
| Color | white | blue | pink |
| Skin Form. time | 25 | 15 | 15 |
| Tack Free time | 55 | 25 | 30 |
| Surface Dry time | 80 | 50 | 60 |
| Total Dry time | 180 | 120 | 180 |

Example 16 of this invention exhibits a significantly decreased dry time relative to Comparative H. Example 17 is barely sufficient in amount of transient colorant to exhibit a decreased dry time in this use under these drying conditions.

EXAMPLES 18–20

Decreasing drying time of a mastic coating on a hazy overcast day

Comparative I was prepared in the same manner as Comparative A hereinabove.

For Example 18, 200 p.p.m. toluidine blue, based on binder weight was added with mixing to Comparative I.

For Example 19, 400 p.p.m. toluidine blue, based on binder weight was added with mixing to Comparative I.

For Example 20, 800 p.p.m. toluidine blue, based on binder weight was added with mixing to Comparative I.

Test methods used for measuring dry times were those presented above in Examples 1–4.

The coated panels were placed outside on a horizontal plywood sheet at Springhouse, Pa. on a hazy, overcast day with approximately 75% cloud cover, with the temperature fluctuating between 72–93 F. and the Relative Humidity fluctuating between 30–55%. Results are reported in Table 18.1

TABLE 18.1

| | Drying time with transient colorants | | | |
|---|---|---|---|---|
| EXAMPLE | Comp. 1 | 18 | 19 | 20 |
| Initial Color | white | lt. blue | med. blue | blue/purple |
| Tack Free Time (min.) | 40 | 25 | 20 | 15 |
| Surface Dry Time (min.) | 120 | 50 | 50 | 35 |
| Total Dry Time (min.) | 190 | 120 | 120 | 90 |

Examples 18–20 of this invention exhibit decreased drying time relative to Comparative I, even under hazy, overcast weather conditions.

What is claimed is:

1. A method for decreasing the drying time of a wet coating comprising admixing said wet coating and at least one transient colorant in an amount effective to decrease said drying time, applying said admixture, which is colored, to a substrate, and drying said coating.

2. The method of claim 1 wherein said substrate is an architectural substrate.

3. The method of claim 1 wherein said amount of said transient colorant is from about 0.001% to about 0.5%, by weight based on the weight of said wet coating.

4. The method of claim 1 wherein said amount of said transient colorant is from about 0.03% to about 0.3%, by weight based on the weight of said wet coating.

5. The method of claim 1 wherein said transient colorant is selected from the group consisting of phenolphthalein, thymolphthalein, cresol red, o-cresolphthalein, fluorescein, aniline blue, toluidine blue, rhodamine B, Janus green B, Toluidine Blue O, Evans blue, Safranin O, rose bengal, methylene blue, ruthenium red, pararosaniline, and mixtures thereof.

6. The method of claim 1 wherein said coating in the wet state is at a pH different from its intrinsic pH and is adapted to change in pH on drying and wherein said transient colorant is a pH-sensitive colorant.

7. The method of claim 1 wherein said coating in the wet state is at a pH higher than its intrinsic pH and is adapted to decrease in pH on drying and wherein said transient colorant is a pH-sensitive colorant.

8. The method of claim 7 wherein said pH-sensitive colorant is selected from the group consisting of phenolphthalein, thymolphthalein, cresol red, o-cresolphthalein, fluorescein, and mixtures thereof.

9. The method of claim 1 wherein said transient colorant is a photobleaching colorant.

10. The method of claim 9 wherein said photobleaching colorant is selected from the group consisting of phenolphthalein, thymolphthalein, cresol red, o-cresolphthalein, fluorescein, aniline blue, toluidine blue, methylene blue, rhodamine B, Janus green B, Toluidine Blue O, Evans blue, Safranin O, rose bengal, ruthenium red, pararosaniline, and mixtures thereof.

11. A method for decreasing the drying time of a wet mastic comprising admixing said wet mastic and at least one transient colorant in an amount effective to decrease said drying time, applying said admixture to a substrate at a wet thickness greater than about 10 mils, and drying said coating.

* * * * *